Figure 1:
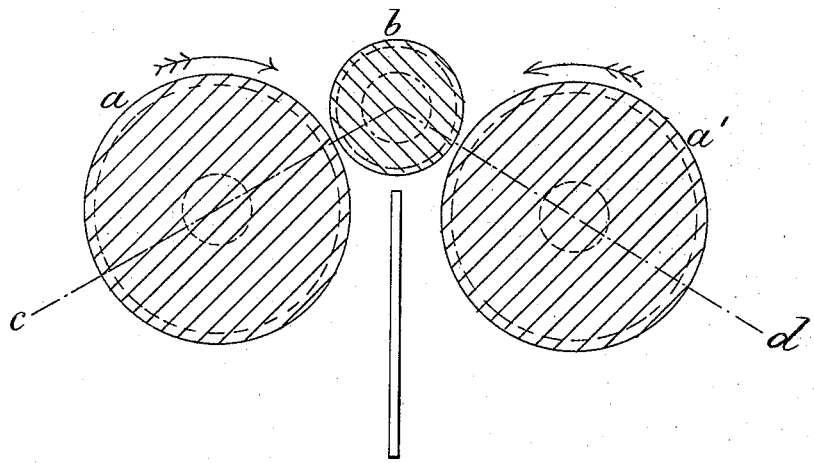

(No Model.)

T. SHELDON.
MACHINE FOR SPLITTING WHEAT.

No. 331,165. Patented Nov. 24, 1885.

Witnesses.
Inventor.
Thomas Sheldon
By James L. Norris.
Atty.

United States Patent Office.

THOMAS SHELDON, OF OXFORD, COUNTY OF OXFORD, ENGLAND.

MACHINE FOR SPLITTING WHEAT.

SPECIFICATION forming part of Letters Patent No. 331,165, dated November 24, 1885.

Application filed August 25, 1885. Serial No. 175,303. (No model.) Patented in England November 19, 1884, No. 15,227.

*To all whom it may concern:*

Be it known that I, THOMAS SHELDON, of Osney Mill, Oxford, in the county of Oxford, England, miller, a subject of the Queen of Great Britain, have invented certain new and useful Improvements in Machines for Splitting Wheat, (for which I have obtained a patent in Great Britain, No. 15,227, bearing date November 19, 1884,) of which the following is a specification.

The object of my invention is to effect the splitting of wheat in a longitudinal direction through the crease in order to facilitate the removal of germs and crease-dirt previously to further reduction.

In carrying out my invention I fit a rotating cylinder or roller the surface of which has annular grooves or corrugations the width and depth of which are formed to suit the size of the wheat operated upon. Near to this revolving roller I fit a bar the face or faces of which may be similarly corrugated to that of the roller. This bar may be of any sectional form, but is preferably made cylindrical, in order that it may be turned, when required, to present fresh working-faces when wear has taken place. This bar receives a reciprocating motion longitudinally by means of cams, eccentrics, or otherwise. Both the reciprocating bar and the roller are made, preferably, of steel or chilled iron, and may be of any desired diameter and length. The reciprocating bar may be placed in such a position relatively to the roller that their line of contact, or of nearest approach to contact, may be either above, below, or in the same horizontal plane as that of the center of the roller, but preferably above and parallel thereto. By means of screws or otherwise a parallel adjustment is obtained, whereby the distance of the bar from the roller or rollers is regulated to suit the size of the wheat.

The operation of the machine is as follows: The wheat, having been sized in the usual manner, is fed to the roller by any suitable means, and the rotation of the roller carries the wheat to the point of nearest approach between the bar and the roller, where the wheat is caught by the reciprocating bar and split longitudinally, as hereinbefore described.

It is obvious that a duplicate roller may be placed on the opposite side of the bar to that of the first-named roller, and thus make a double machine with one reciprocating bar.

In some cases I make the bar stationary and communicate both a rotary and reciprocating motion to the roller, and in other cases both the bar and the roller or rollers may be caused to revolve and oscillate or reciprocate; and in order that my said invention may be more particularly described and ascertained reference is hereby made to the accompanying drawings, in which similar letters of reference indicate corresponding parts.

Figure 2:
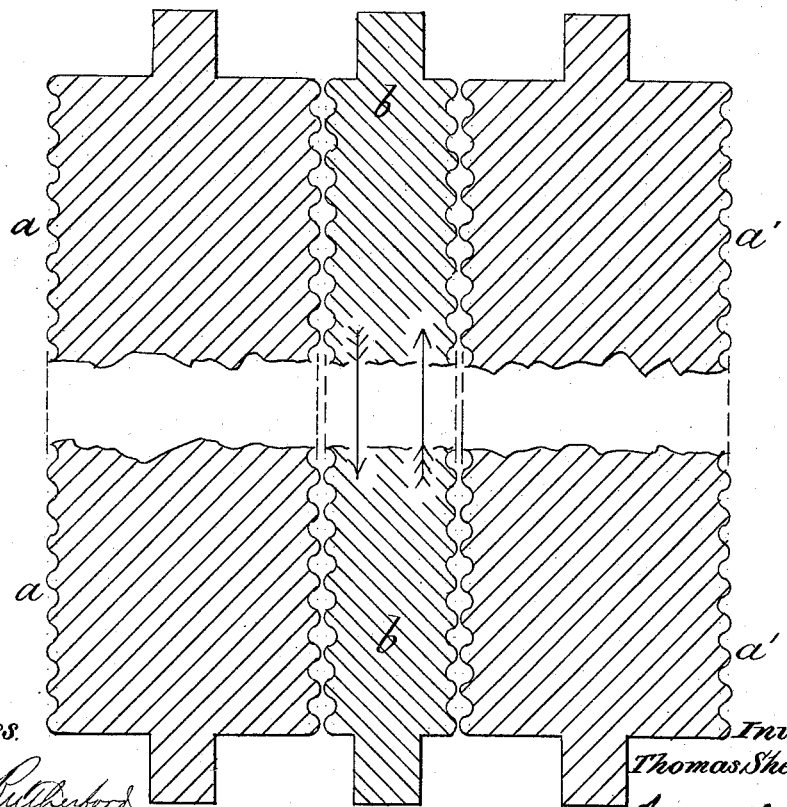

Figure 1 is a sectional elevation showing the two rollers $a$ and $a'$ in a suitable position for operating on the wheat, and the reciprocating bar $b$ in an intermediate position. Fig. 2 is a section on the line $c\ d$ of Fig. 1.

The rollers $a$ and $a'$ are caused to revolve in the direction of the arrows by any suitable and well-known mechanism; and the bar $b$ receives at the same time a reciprocating motion, as indicated by the arrows in Fig. 2, by means of eccentrics, cams, or equivalent devices.

Having now particularly described and ascertained the nature of my said invention and in what manner the same is to be performed, I declare that what I claim is—

1. The combination, in a machine for splitting wheat lengthwise along the creases of the grain, of a rotating annularly-grooved roller, and a reciprocating annularly-grooved bar arranged adjacent and parallel to the roller, substantially as described.

2. A machine for splitting wheat lengthwise along the creases of the grain, combining in its structure two annularly-grooved outside rollers revolving in opposite directions, and an intermediate longitudinally-reciprocating bar having annular grooves, substantially as described.

In testimony whereof I have hereunto set my hand this 5th day of August, 1885.

THOMAS SHELDON.

Witnesses:
 THOS. BELLMAN,
  *No. 9 New Road, Oxford,*
 FREDERICK PERCY THORNTON,
  *1 Park End Street, Oxford,*
 *Both Clerks to Thomas Marriott Davenport, Notary Public, Oxford.*